United States Patent [19] [11] 4,309,371
Daviot et al. [45] Jan. 5, 1982

[54] PREPARING REFRACTORY INSULATING PRODUCTS HAVING CONTROLLED POROSITY BY THE WET METHOD

[75] Inventors: Jean Daviot, Saint-Cheron; Michel Marchais, Chatillon, both of France

[73] Assignee: Groupement pour les Activities Atomiques et Advancees, Le Plessis Robinson, France

[21] Appl. No.: 55,671

[22] Filed: Jul. 9, 1980

Related U.S. Application Data

[63] Continuation of Ser. No. 873,753, Jan. 30, 1978, abandoned, which is a continuation-in-part of Ser. No. 679,585, Apr. 23, 1976, abandoned, which is a continuation of Ser. No. 473,979, May 28, 1974, abandoned.

[30] Foreign Application Priority Data

May 30, 1973 [FR] France ................................ 73.19773
Feb. 21, 1974 [FR] France ................................ 74 05959

[51] Int. Cl.³ ................................................ C04B 7/32

[52] U.S. Cl. ........................................ 264/43; 106/97; 106/99; 264/45.3; 264/333

[58] Field of Search .................. 264/42, 45.3, 333, 43; 106/86, 97, 40 R, 99

[56] References Cited

U.S. PATENT DOCUMENTS 3,269,849  8/1966  Caprio .................................... 106/99
3,294,562 12/1966  Caprio .................................... 106/64
3,758,319  9/1979  Ergene .................................... 264/333

Primary Examiner—John A. Parrish
Attorney, Agent, or Firm—Sughrue, Mion, Zinn, Macpeak & Seas

[57] ABSTRACT

Process for preparing, by the wet method, refractory insulating products, comprising mixing a refractory aluminous cement, a refractory aggregate, and aluminous fibers, making a stable emulsion in water of said mixture, molding and drying the product, and firing the molded product at a temperature lower than its sintering temperature.

7 Claims, No Drawings

PREPARING REFRACTORY INSULATING PRODUCTS HAVING CONTROLLED POROSITY BY THE WET METHOD

This application is a continuation application of Ser. No. 873,753, filed Jan. 30, 1978, now abandoned, in turn a continuation-in-part application of Ser. No. 679,585, filed Apr. 23, 1976, now abandoned in turn a continuation of Ser. No. 473,979, filed May 28, 1974 now abandoned. Ser. No. 881,337, now U.S. Pat. No. 4,142,908, is a continuation-in-part application of Ser. No. 621,102, filed Oct. 9, 1975, now abandoned which in turn is a divisional application of Ser. No. 473,979, filed May 28, 1974 now abandoned.

BACKGROUND OF THE INVENTION

1. Field of the Invention

The present invention concerns a process for preparation by the wet method of insulating refractory products having controlled porosity.

2. Description of the Prior Art

It is known that the manufacturing of devices for casting, purifying and handling molten metals and more particularly corrosive molten metals such as aluminium, is conditioned by the perfectioning of refractory materials capable simultaneously of bearing the high temperature at which these molten metals are kept, of withstanding effectively their corrosive and erosive action and of bearing the thermal shock to which the walls of these devices are subjected.

During the last few years, various efforts have been made with a view to perfecting such materials. In general, these efforts have made it possible to obtain refractory products of the ceramic type which withstand well the aggressiveness of metals. But these products are not very resistant to thermal shocks.

It was disclosed by W. D. Kingery, Introduction to Ceramics, 1960, that increasing the porosity of a given refractory material lends to better spalling resistances up to an optimum porosity of 10 to 20%. However, a high porosity appeared to mean a wetting of the pores of the refractory by the molten metal, and therefore a poor resistance to erosion, so that the refractory products proposed up to now for containers or pumps for molten metals of a relatively low melting point such as molten aluminium and aluminium-base alloys, molten zinc and molten zinc-base alloys, were of a relatively low porosity and therefore of a relatively low resistance to thermal shock, and had to be frequently replaced in use.

The wet method of preparation of refractories consists in mixing in the dry state the components of the refractory, in dispersing them in water with a foaming agent to form a foamed slip, in stabilizing the foam by the addition of a stabilizing agent, in pouring the foamed slip into lubricated metal moulds, then in drying the articles and firing them.

That method was not used up to now for the manufacture of products of a very high porosity, for instance higher than 50%, since such products were believed to have too little cohesion to withstand erosion by molten metals. In a known method, the product obtained after drying was fired at a temperature in the order of 1.700° C., and therefore sintered, so that there remained little porosity. In another known method disclosed in U.S. Pat. Nos. 3,294,562 and 3,269,849 of Caprio et al., the firing was effected at a relatively low temperature, but the slip was pressed into a slab or board-like form under high pressure before being dried and fired, so that its porosity was also low.

It is an object of the present invention to provide a process of preparation by the wet method of refractory products of a high porosity showing high resistances to thermal shock and to erosion and corrosion by molten metals such as molten aluminium and aluminium-base alloys.

It is another object of the invention to provide a process of preparation by the wet method of refractory products of a coefficient of heat conduction between 0.1 and 0.5 Kcal/m/sq.m/d°C./hour, and therefore of an excellent thermal insulation.

It is another object of the invention to provide a process of preparation by the wet method of refractory products very stable both chemically and dimensionally.

It is still another object of the invention to provide a process of preparation by the wet method of containers, pumps or like articles for the handling of molten metal such as molten aluminium and aluminium-base alloys, of a long service life.

SUMMARY OF THE INVENTION

The process according to the invention comprises the following steps:

producing a solid mixture of a refractory aluminous cement and a ceramic mixture of:

a refractory aggregate selected from the group consisting of tabular alumina, corindon, stabilized zirconia and calcium zirconate, and refractory ceramic polycrystalline fibers comprising at least 70% by weight alumina and at most 30% silica, the proportion of ceramic fibers being higher than 10% by weight of the amount of refractory aggregate, and the proportion of the ceramic mixture being between 10% and 70% by weight of the total mixture;

dispersing said solid mixture in water;

emulsifying the dispersed product by adding 0.5% to 3% by weight, in relation to the weight of the water, of a foaming agent which is stable in a medium of a pH greater than 3;

stabilizing the emulsion by adding a stabilizing agent;

molding and drying the product in a mould having lubricated walls;

and firing the molded product at a temperature lower than its sintering temperature.

The final porosity of the final product is directly a function of the water/cement ratio.

The result of this is that the proportion of water to be mixed at the time of the dispersion must be very strictly defined.

The preparing of the intermediate emulsified product may be effected by preparing separately the dry mixture of refractory cement and of aggregates and producing, on the other hand, a stable foam with water and dispersing the dry product in the foam.

The preparing of the intermediate emulsified product may also be effected by mixing simultaneously the components in water to which the foamy product has been added.

The refractory cement used basically consists, to great advantage, of calcium aluminate, but it can be richer in alumina than calcium aluminate.

The refractory aggregates to be commonly used are tubular alumina, black or white corindon, stabilized zirconia, calcium zirconate. The fibres must contain at least 70% by weight alumina, with up to 30% silica, but higher alumina contents, for instance 85%, are preferable.

To obtain the foam in which the dispersing is effected, it is possible to take any foaming agent except those which are stable exclusively in a very acid medium (pH<3).

The stabilizing agent used was always an organic product stable in an alkaline medium (pH<10) having a reticulated structure with large meshing. This may be a soluble resin or a polysaccharide or a polysulphate.

DESCRIPTION OF THE PREFERRED EMBODIMENT

According to the example of embodiment, 8 kg of Lafarge aluminous cement type SECAR 250 with about 73% alumina, and the remainder essentially calcium oxide, and 6 kg of tabular alumina type T 60 passing through the sieve 22 (US Standard 100 mesh), manufactured by ALCOA, are placed in a MORITZ mixer. The mixing is continued for an hour. 6 kg of refractory polycrystalline fibres formed by a stable compound of alumina and of silica of the FIBRAL type manufactured by the fresh company SEFR, comprising about 85% alumina and 14.5% silica by weight, are added; the whole is mixed again for an hour.

The product obtained is placed in a MORITZ turbo-mulling machine, consisting of a closed enclosure of a capacity of 50 liters, provided with a blade rotating at a speed adjustable between 0 and 1000 Ωpm, having a double casing allowing the cooling of the mixture by a flow of water, 10 kg of water; 50 g of foamy product of the ZIMMER AND SCHWARTZ W53FL type as well as 20 g of ZUSOPLAST PSI stabilizing agent of ZIMMER AND SCHWARTZ are added.

The emulsion is obtained after 2 minutes. It is cast in a steel mould previously lubricated with JOHNSON No. 103 polish, then dried and fired according to the following programme, the maximum temperature being 800° C., this being very much below the sintering temperature of the product.

After 24 hours of setting, the part is stripped and heated in a furnace in a damp atmosphere according to the following programme:

From ambiant temperature to 150° C. at a rate of 10° C. per hour with stage of 10 hours at 60° C., at 95° C. and a stage of 20 hours at 150° C. After drying, the part is fired according to a programme comprising a rise of 10° C. per hour up to 500° C. with a stage of 10 hours at 300° C., then a rise at a rate of 50° C. per hour up to 800° C.

The refractory product thus obtained has an apparent density of about 1.1 and a porosity of 72.5%. Its mechanical properties are the following:

Resistance to breaking: $\sigma = 40$ kg/cm$^2$
Dilation coefficient: $\alpha = 5.10^{-6}$
Young's modulus: $E = 2.10^5$ kg/cm$^2$ so that the temperature difference above which fracture will occur as a result of thermal shock (Kingery, Introduction to Ceramics, 1960, p. 635-636).

$$Tf = k \frac{\sigma}{\alpha \cdot E} = 0.4 \ k.$$

That temperature difference is about 5 to 10 times higher than that obtained with a similar product with refractory fibers of about 50% by weight alumina and 50% silica.

Moreover, pumps for molten aluminium, with inner parts in contact with the molten aluminium made up with refractory, have withstood 1000 hours of operation without any substantial crack or spalling, erosion or corrosion of the refractory.

The refractory products according to the invention are therefore highly valuable for equipment for treating molding and pumping corrosive molten metals such as aluminium, aluminium-base alloys, zinc and zinc-base alloys.

What we claim is:

1. A process for preparing, by the wet method, non-sintered refractory products of controlled porosity having resistance to molten aluminum, aluminum-base alloys, zinc and zinc-base alloys, comprising the following steps:
   producing a solid mixture of a refractory aluminous cement and a ceramic mixture of:
   a refractory aggregate selected from the group consisting of tabular alumina, corindon, stabilized zirconia and calcium zirconate, and
   refractory ceramic polycrystalline fibers comprising at least 70% by weight alumina and at most 30% silica, the proportion of ceramic fibers being higher than 10% by weight of the amount of refractory aggregate, and the proportion of the ceramic mixture being between 10% and 70% by weight of the total mixture;
   dispersing said solid mixture in water;
   emulsifying the dispersed product by adding 0.5% to 3% by weight, in relation to the weight of the water, of a foaming agent which is stable in a medium of a pH greater than 3;
   stabilizing the emulsion by adding a stabilizing agent;
   molding and drying the product in a mould having lubricated walls;
   and firing the molded product at a temperature higher than 150° C. but lower than its sintering temperature.

2. A process according to claim 1, wherein the weight amounts of refractory aggregate and ceramic polycrystalline fibers are substantially equal.

3. A process according to claim 1, wherein the proportion of the ceramic mixture is about 60% by weight of the total mixture.

4. A process according to claim 1, wherein the weight amount of water is substantially 50% of the amount of said solid mixture.

5. A process according to claim 1, wherein the stabilizing agent is an organic product having a reticulate structure with large meshing stable in an alkaline medium of a pH lower than 10.

6. A process according to claim 5, wherein the stabilizing agent is selected from the group consisting of soluble resins, polysaccharides and polysulphates.

7. A process according to claim 1, wherein the firing is carried out at a temperature of about 800° C.

* * * * *